(12) United States Patent
Rau et al.

(10) Patent No.: US 11,126,968 B2
(45) Date of Patent: *Sep. 21, 2021

(54) CUSTOM APPLICATION BUILDER FOR SUPPLY CHAIN MANAGEMENT

(71) Applicant: Blue Yonder Group, Inc., Scottsdale, AZ (US)

(72) Inventors: Anand Rau, Irvine, CA (US); Tarak Patel, Corona, CA (US)

(73) Assignee: Blue Yonder Group, Inc., Scottsdale, AZ (US)

(*) Notice: Subject to any disclaimer, the term of this patent is extended or adjusted under 35 U.S.C. 154(b) by 164 days.

This patent is subject to a terminal disclaimer.

(21) Appl. No.: 16/736,361

(22) Filed: Jan. 7, 2020

(65) Prior Publication Data

US 2020/0143326 A1    May 7, 2020

Related U.S. Application Data

(63) Continuation of application No. 11/371,985, filed on Mar. 8, 2006, now Pat. No. 10,572,856.

(Continued)

(51) Int. Cl.
*G06Q 10/00* (2012.01)
*G06Q 10/10* (2012.01)
(Continued)

(52) U.S. Cl.
CPC .............. *G06Q 10/10* (2013.01); *G06Q 10/06* (2013.01); *G06Q 10/08* (2013.01); *G06Q 10/0835* (2013.01); *G06Q 40/04* (2013.01)

(58) Field of Classification Search
CPC ........ G06Q 10/10; G06Q 10/06; G06Q 10/08; G06Q 10/0835; G06Q 10/083; G06Q 10/063; G06Q 40/04
See application file for complete search history.

(56) References Cited

U.S. PATENT DOCUMENTS

| 5,603,034 A | 2/1997 | Swanson |
| 5,754,858 A | 5/1998 | Broman et al. |

(Continued)

FOREIGN PATENT DOCUMENTS

| WO | WO2002/037311 | 5/2002 |
| WO | WO2004/034305 | 4/2004 |

OTHER PUBLICATIONS

Rossi, G., Schwabe, D., & Guimaraes, R. (2001). Designing Personalized Web Applications. In Conference proceedings: the Tenth International World Wide Web Conference, Hong Kong, May 1-5, 2001 (pp. 275-284). New York: ACM.

(Continued)

*Primary Examiner* — William S Brockington, III
(74) *Attorney, Agent, or Firm* — Spencer Fane LLP; Steven J. Laureanti

(57) ABSTRACT

Supply chain management is performed by building a user-defined custom application that uses supply chain data. The supply chain data is returned for display and/or use in the custom application based on metadata stored in a database that is arranged to store supply chain data. The metadata specifies a stored procedure that when called based on parameters in a request generated in response to a user selecting a custom application, returns the supply chain data that may be used in whole or in part in the custom application.

20 Claims, 15 Drawing Sheets

Related U.S. Application Data

(60) Provisional application No. 60/660,543, filed on Mar. 9, 2005.

(51) Int. Cl.
  *G06Q 10/08* (2012.01)
  *G06Q 10/06* (2012.01)
  *G06Q 40/04* (2012.01)

(56) References Cited

U.S. PATENT DOCUMENTS

| | | |
|---|---|---|
| 5,950,001 A | 9/1999 | Hamilton et al. |
| 6,308,178 B1 | 10/2001 | Chang et al. |
| 6,957,191 B1 | 10/2005 | Belcsak et al. |
| 6,988,138 B1 | 1/2006 | Alcorn et al. |
| 7,032,006 B2 | 4/2006 | Zhuk |
| 7,058,587 B1 | 6/2006 | Horne |
| 7,263,663 B2 | 8/2007 | Ballard et al. |
| 7,269,625 B1 | 9/2007 | Willhide et al. |
| 7,325,015 B2 | 1/2008 | Zhou et al. |
| 7,353,378 B2 | 4/2008 | Vaszary et al. |
| 7,389,249 B2 | 6/2008 | Hsu et al. |
| 7,577,907 B2 | 8/2009 | Vishnia-Shabtai et al. |
| 7,734,999 B2 | 6/2010 | Leung et al. |
| 7,761,319 B2 | 7/2010 | Gil et al. |
| 8,312,382 B2 | 11/2012 | Gilboa et al. |
| 8,484,553 B2 | 7/2013 | Lloyd et al. |
| 2002/0032611 A1 | 3/2002 | Khan |
| 2002/0111953 A1 | 8/2002 | Snyder |
| 2003/0069766 A1* | 4/2003 | Hoffman ............. G06Q 10/063 705/7.25 |
| 2003/0074247 A1 | 4/2003 | Dick et al. |
| 2003/0204425 A1* | 10/2003 | Kennedy ............. G06Q 30/02 709/206 |
| 2003/0212654 A1 | 11/2003 | Harper et al. |
| 2004/0060002 A1 | 3/2004 | Lucovsky et al. |
| 2005/0021348 A1 | 1/2005 | Chan et al. |
| 2005/0022198 A1* | 1/2005 | Olapurath ............. G06F 8/34 718/102 |
| 2005/0091601 A1 | 4/2005 | Raymond et al. |
| 2005/0262453 A1 | 11/2005 | Massasso |
| 2006/0101391 A1 | 5/2006 | Ulke et al. |

OTHER PUBLICATIONS

David Simchi-Levi et al., "Designing and Managing the Supply Chain: Concepts, Strategies, and Case Studies"; McGraw-Hill Higher Education; ISBN 0-256-26168-7; 1999, 12 pages.

Eva Schroeter and Jon D. Patrick, "An Application Interface With Multiple Workspaces: The Context Switcher"; Proceedings of the 6th Australian Conference on Computer-Human Interactions (OZCHI '96); 1996, pp. 318-319.

* cited by examiner

50 ⟶

Custom Application Administration

| Custom Applications | 410 |

[View] [Modify] [Delete] | Select Action ⌄ |

420

| Application Name |
|---|
| Email Notifications |
| LEO_Notification |
| A01 |
| Order Line History |
| DK Order Line History |
| Notes |

Select Action
Copy
Access Admin
Search Administration
New Exception Manager
New Transaction State Model
New Order Manager
New Forecast Manager
New RCF Manager
New Notification Manager
New JSA Manager
New Inventory Manager
View Application/Report Modules

Custom Application Administration

| Custom Applications |
| --- |

[View] [Modify] [Delete]  |  [Select Action]

420

| Application Name | Mod |
| --- | --- |
| TestErrorLog | Exc |
| Test Error Captions | Exc |
| RCFErrLog | Exc |
|  | Exc |
| Test Trace Captions | Exc |
| Test13 Error Log ARB | Exc |
| Test13 Error Log ARB (Copy) | Exc |
| Test13 Trace Log Test ARB | Exc |
| Trace Log 1 | Exc |
| bekman1 | Exc |

Custom Application Wizard

| Step 1 : Add basic Information |

[ < Back ] [ Next > ] | [ Save ] [ Cancel ] | [S

Add basic information instructions.

610 ⭢ Custom Application Category — [Error Log]
620 ⭢ Custom Application Name — Test13 CV Trace Error I
630 ⭢ Custom Application Description — Trace Error Log test for

Custom Application Wizard

Step 2 : Select Columns

[ < Back ] [ Next > ] | [ Save ] [ Cancel ] | [ S

Select the columns you would like to display i

710 ─┐

| Error Information | Calculate Column |

| | Column Name | ─ 730 |
|---|---|---|
| ☑ | Error Log ID | |
| ☑ | Error ID | |
| ☑ | GUID | |
| ☑ | Source | |
| ☑ | Username | |
| ☑ | Message | |
| ☑ | Additional Details | |
| ☑ | Error Date | |
| ☑ | Record Date | |

Custom Application Wizard

Step 2 : Select Columns

[ < Back ] [ Next > ] | [ Cancel ]

Select the columns you would like to display i

710 ⇗

| | | Name | Rename Colum |
|---|---|---|---|
| * | ✓ | Column-1 | Column-1 |

[ Add ]

Custom Application Wizard

Step 5 : Select Actions

[ < Back ]  [ Next > ]  |  [ Cancel ]

Select the actions that you want to perform in

| Error Information | |
|---|---|
| | Action Name |
| ☑ | View Details |

FIG. 13

CUSTOM APPLICATION BUILDER FOR SUPPLY CHAIN MANAGEMENT

CROSS-REFERENCE TO RELATED APPLICATIONS

This application is a continuation of U.S. patent application Ser. No. 11/371,985, filed on Mar. 8, 2006, entitled "Custom Application Builder for Supply Chain Management," which claims the benefit under 35 U.S.C. § 119(e) to U.S. Provisional Application No. 60/660,543, filed Mar. 9, 2005, and entitled "Custom Application Builder for Supply Chain Management." U.S. patent application Ser. No. 11/371,985 and U.S. Provisional Application No. 60/660,543 are assigned to the assignee of the present application. The subject matter disclosed in U.S. patent application Ser. No. 11/371,985 and U.S. Provisional Application No. 60/660,543 is hereby incorporated by reference into the present disclosure as if fully set forth herein.

Further, the subject matter of the present application may be related to subject matter in the following commonly owned applications: U.S. patent application Ser. No. 11/158,371, filed on Jun. 22, 2005 and entitled "Program-Based Supply Chain Management", which claims the benefit of U.S. Provisional Patent Application No. 60/659,829, filed on Mar. 8, 2005 and entitled "Program-Based Supply Chain Management" and U.S. patent application Ser. No. 11/371,960, filed on Mar. 8, 2006, now U.S. Pat. No. 8,666,870, and entitled "Configuration State Model for Supply Chain Management", which claims the benefit of U.S. Provisional Patent Application No. 60/660,747, filed on Mar. 10, 2005 and entitled "Configurable State Model for Supply Chain Management".

TECHNICAL FIELD

The present disclosure generally relates to supply chain management applications and more particularly relates to customizing the display and use of supply chain data in supply chain management applications.

BACKGROUND

In general, a "supply chain" relates to the flow of goods, services, and/or associated information from a source to a consumer. The supply chain may include various entities, any one or combination of which are, for example, capable of: receiving an order from a consumer; processing the order; managing payment for the order; determining the resources needed to fulfill the order; determining a course of action to fulfill the order; managing the flow of and/or distributing information regarding the order; managing resources needed to fulfill the order; manufacturing and/or integrating components of the order (e.g., assembling the parts of an ordered good); distributing the ordered good and/or service to the consumer; and forecasting needs and sales of future orders based on previous orders. Those skilled in the art will note that distributing responsibilities and functions over various entities in a supply chain may result in overall or targeted cost savings, improved order processing efficiency (e.g., improved delivery times), and/or improved quality of ordered goods and services.

FIG. 1 shows a typical supply chain 5. Order flow in the supply chain 5 generally begins when a consumer 10 places an order with a retailer 12. The retailer 12 may be a "brick-and-mortar" store or an "online" outfit accessible via the Internet. The retailer 12 receives the order from the consumer 10, checks the order for errors, and ensures payment for the order. Payment for the order may occur through direct payment at the time the order is placed, payment based on a line of credit established for the consumer 10, or charge for the order at the time the order is fulfilled and shipped to the consumer 10.

The retailer 12, based on the placed order, forwards the order to a manufacturer 14. The manufacturer 14, based on the needs of the placed order, either uses "on-hand" parts or obtains them from any one or more of parts suppliers (e.g., wholesalers) 16, 18, 20. Upon manufacture of the ordered good, a distributor 22 delivers or causes the delivery of the ordered good to the consumer 10.

Further, as discernible from FIG. 1, information regarding the placed order and status thereof may be distributed in any variation across the entities shown in FIG. 1. For example, the distributor 22 may inform the retailer 12 when the ordered good is shipped to the consumer 10.

Managing the flow of goods, materials, services, and/or associated information in a supply chain, such as that shown in FIG. 1, is referred to as "supply chain management" (SCM). In general, supply chain management involves managing the design, planning, execution, control, and monitoring of processes and activities of a supply chain. Such management is generally performed with the objectives of, for example, reducing inventory, increasing delivery times, reducing costs, increasing sales, synchronizing supply with current and forecasted demand, and/or increasing overall order processing efficiency.

SUMMARY

According to at least one aspect of one or more embodiments of the present invention, a computer-implemented method for building a custom application for supply chain management comprises: storing application parameters for a trading partner in a supply chain, where the application parameters describe at least one customized display of supply chain data for the trading partner based on a role of the trading partner; receiving a request for supply chain data from the trading partner; and responsive to the request, providing the requested supply chain data to the trading partner in accordance with the stored application parameters.

According to at least one other aspect of one or more embodiments of the present invention, a supply chain management system for building a custom application comprises: a web interface arranged to allow a trading partner to provide application parameters for the custom application; a custom application builder module arranged to generate a request for supply chain data based on the provided application parameters; and a database arranged to store the supply chain data, where the database is arranged to return the supply chain data to the custom application builder module based on parameters specified in the request.

According to at least one other aspect of one or more embodiments of the present invention, a method of supply chain management comprises: receiving a request from a user for supply chain data stored in a database, where the request comprises parameters specifying a category of the supply chain data needed for an application selected by the user; invoking a procedure to return the supply chain data from the database to the user at least partly based on the parameters in the request; and returning the supply chain data for display and use by the application according to customization preferences selected by the user.

According to at least one other aspect of one or more embodiments of the present invention, a method of supply chain management comprises: selecting a type of application for viewing supply chain data, where the supply chain data is stored in a database; generating a web-based request for the supply chain data based on the selecting; and selectively customizing a display of at least a portion of the supply chain data returned from the database in response to the web-based request.

According to at least one other aspect of one or more embodiments of the present invention, a supply chain management system comprises: a user system accessibly by a user, where the user system provides the user a capability to build a custom application requiring supply chain data; a web interface accessible by the user system, where the web interface is arranged to handle a request from the user system for the supply chain data; and a database arranged to store the supply chain data, where a procedure in metadata stored in the database is invocable to return the supply chain data based on parameters in the request.

According to at least one other aspect of one or more embodiments of the present invention, a computer-readable medium having instructions recorded therein to: render a web-based application for allowing a user to select an application to customize, where the application requires supply chain data; receive a request from the user to view supply chain data using the application; authenticate the request; transmit the authenticated request to a database having a procedure stored therein, the procedure invocable to return supply chain data specified by parameters in the request; and provide the user with at least one of selectable and definable preferences for the application to view and use at least a portion of the returned supply chain data.

The features and advantages described herein are not all inclusive, and, in particular, many additional features and advantages will be apparent to one skilled in the art in view of the drawings, specification, and claims. Moreover, it should be noted that the language used in the specification has been principally selected for readability and instructional purposes and may not have been selected to circumscribe the claimed invention.

BRIEF DESCRIPTION OF THE DRAWINGS

FIG. 4 illustrates a screenshot of a user interface for building a custom application in accordance with an embodiment of the present invention;

FIG. 5 illustrates a screenshot of a user interface for building a custom application in accordance with an embodiment of the present invention;

FIG. 6 illustrates a screenshot of a user interface for building a custom application in accordance with an embodiment of the present invention;

FIG. 7 illustrates a screenshot of a user interface for building a custom application in accordance with an embodiment of the present invention;

FIG. 8 illustrates a screenshot of a user interface for building a custom application in accordance with an embodiment of the present invention;

FIG. 9 illustrates a screenshot of a user interface for building a custom application in accordance with an embodiment of the present invention;

FIG. 13 illustrates a screenshot of a user interface for building a custom application in accordance with an embodiment of the present invention;

DETAILED DESCRIPTION

In the following description of embodiments of the present invention, numerous specific details are set forth in order to provide a more thorough understanding of the present invention. However, it will be apparent to one skilled in the art that the present invention may be practiced without one or more of these specific details. In other instances, well-known features have not been described in detail to avoid unnecessarily complicating the description.

Generally, embodiments of the present invention relate to methods and systems for supply chain management. In one or more embodiments, supply chain management software allows a user to build custom applications for interacting with supply chain related data.

Figure 1:
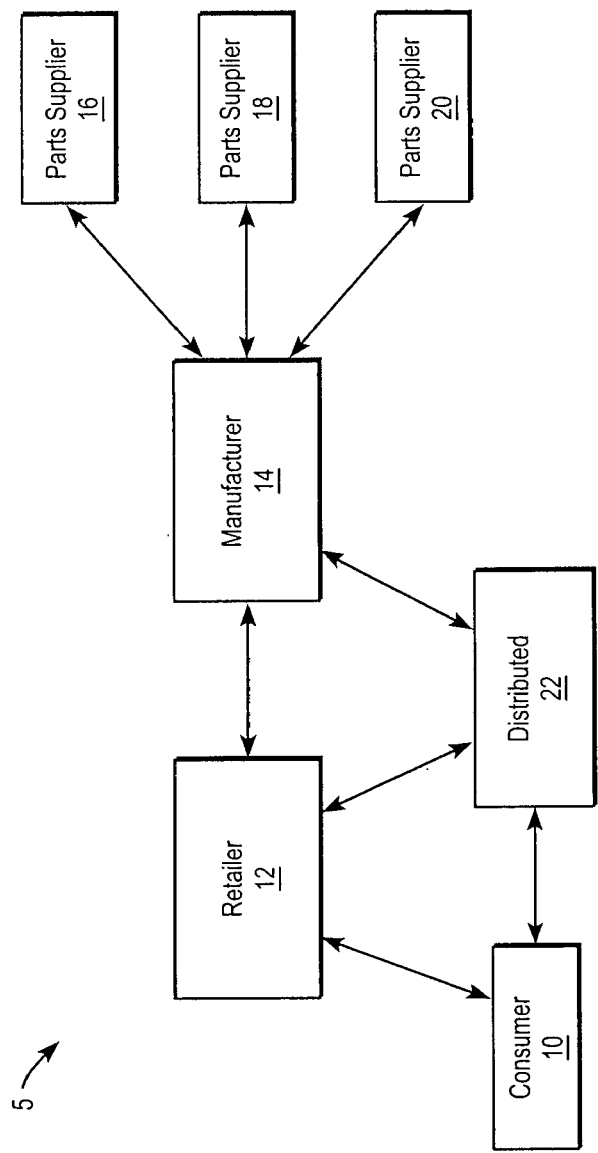
FIG. 1 illustrates a block diagram of a typical supply chain.
Figure 2:
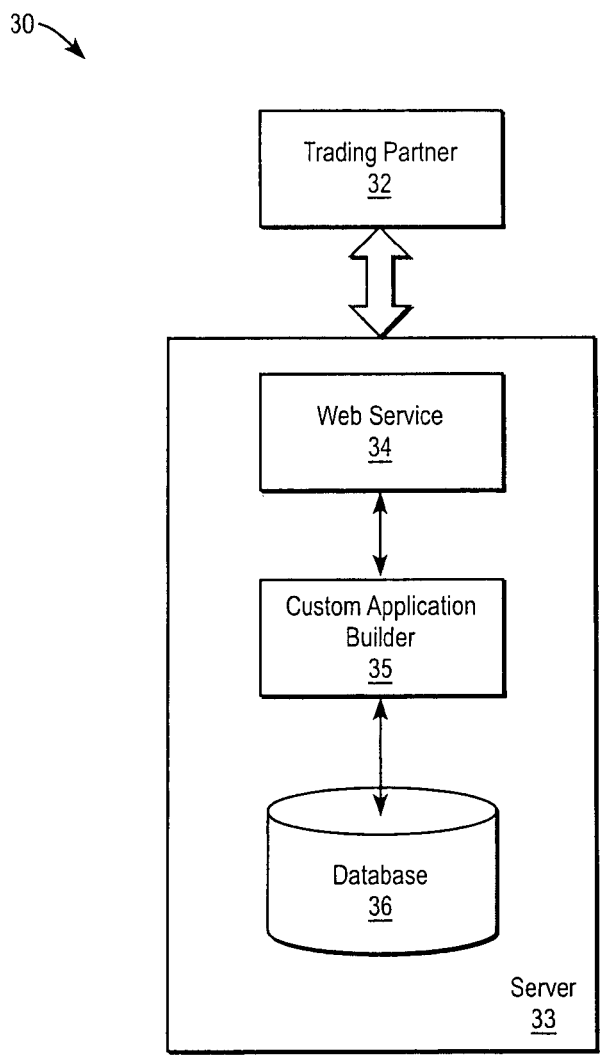
FIG. 2 illustrates a block diagram of a supply chain management system in accordance with an embodiment of the present invention.

FIG. 2 shows at least a portion of a supply chain management system 30 in accordance with an embodiment of the present invention. A user at trading partner (e.g., consumer, retailer, manufacturer, parts supplier, distributor) 32 desiring to interact with (e.g., view, act upon) supply chain related data may build a "custom" application using data in one or more particular "modules" ("customization" further described below with reference to FIGS. 3-15). A module in system 30 may relate to any aspect of supply chain management. For example, a module may relate to purchase order data, inventory data, forecasting data, invoice data, and/or management data.

Accessing and customizing the use and display of module data involves passing a request from the trading partner 32 to a supply chain management server 33 (via, for example, an HTML application (i.e., the trading partner 32 may communicate with the supply chain management server 33 over the Internet)). The request generally includes application parameters as to, for example, the type of application the trading partner 32 wishes to customize. Further, in one or more embodiments, the application parameters may be dependent on or relate to a role of trading partner 32 in the supply chain. For example, a distributor may request module data that specifically pertains to the function of the distributor.

In one or more embodiments, a request for module data by trading partner 32 may be generated by a software application resident at the trading partner 32. In one or more other embodiments, the trading partner 32 may access a web-based application to generate the request, where the web-based application is rendered by a web service 34. Regardless of how the request for module data is generated, the web service 34 may require identification information to authenticate the user at trading partner 32. The provided identification information may further indicate what permissions the user at trading partner 32 has to access particular module data. For example, the user at trading partner 32 may have permission to access purchase order data but may not have permission to access data relating to administrative functions.

Further, those skilled in the art will note that web service 34 may support various platforms. For example, in one or more embodiments, web service 34 may support both Microsoft Windows®-based clients and Apple Macintosh® operating system-based clients.

Once authenticated, the module data request is passed from the web service 34 to custom application builder module 35. The custom application builder module 35 generates one or more messages based on the module data request. In one or more embodiments, these messages may be coded in an extensible markup language (XML) format.

The messages generated by the custom application builder module 35 are passed to a database 36. Although database 36 is shown in FIG. 2 as being part of the supply chain management server 33, those skilled in the art will note that in one or more embodiments, database 36 may not be part of the supply chain management server 33. Instead, database 36 may be operatively connected to the supply chain management server 33 via, for example, a network connection.

Database 36 contains definitions of various modules. The definition of a module (a "module definition file") specifies, for example, (i) the location of data in the database 36 for the module and (ii) a stored procedure to invoke when an application of the module is instantiated. Further, in one or more embodiments, the definition of a module may be described in metadata, e.g., an XML file. Thus, from a programming perspective, a developer specifies the appropriate metadata, stores the metadata in the database 36, and creates a method that effectively allows a user-level application to extract data from the database 36 to the module used to implement the user-level application. Further, in one or more embodiments, a new definition of a module or a definition of a new module may be uploaded to the database 36 at any time.

The stored procedure of a module is called in response to receiving a message for data of the module from the custom application builder module 35. When the stored procedure is called, data associated with the corresponding module is returned from the database 36 to the custom application builder module 35. In general, the custom application builder module 35 generates and renders user interfaces (UIs) that allow a user at trading partner 32 to interact with supply chain data via web service 34. As further described below with reference to FIGS. 3-15, the display and/or use of module data returned to the custom application builder module 35 is customizable by the user at trading partner 32 via web service 34.

Further, in one or more embodiments, supply chain data stored in the database 36 may be updated (e.g., removed, modified, added, reorganized) based on activities in a supply chain associated with the database 36. Further still, in one or more embodiments, a user building a custom application via, for example, web service 34, may additionally directly update or indirectly cause to update supply chain data stored in the database 36.

Figure 3:
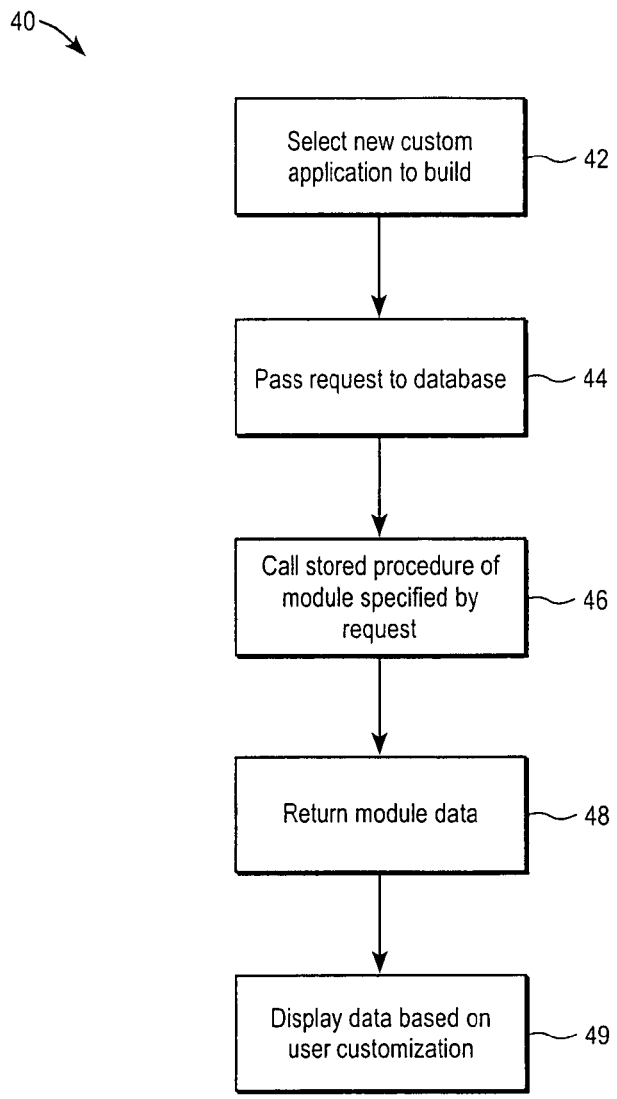
FIG. 3 illustrates a flow process for supply chain management in accordance with an embodiment of the present invention.

FIG. 3 shows a flow process 40 for supply chain management in accordance with an embodiment of the present invention. Initially, a user, via, for example, a web interface, selects a new custom application to build 42. Based on the selection, the web interface generates an XML message that is passed to a database 44, which in turn calls a stored procedure of the module specified by parameters in the XML message 46. Thereafter, the appropriate module data is returned by the database 48 and displayed to the user, via the web interface, based on the user's customization of the selected application 49. The user's customization selections may be selected via the web interface so that when supply chain data is returned from the database, that supply chain data may be displayed according to the user's customization preferences/selections.

As described above with reference to FIGS. 2 and 3, a user may build custom applications for interacting with module data. FIGS. 4-14 show user interfaces that may be used to build one or more custom supply chain management application. FIG. 4 shows a screenshot 50 of a user interface that allows the user to select a type of custom application to build. As shown in FIG. 4, the user can select using a pull-down menu any one of various actions to create a new custom application.

Further, in one or more embodiments, the application types shown in FIG. 4 may be associated with "child" applications (not shown) that may be selected by the user. In such embodiments, the user may create a child application and then link the child application to its parent.

Customizing Applications

In general, in one or more embodiments, a user may customize the display and use of module data returned from a database (e.g., database 36 in FIG. 2). The customized display may provide for any combination of the following: a selection of columns to display and one or more user-defined column names; user-defined column widths and alignments; a selection of default sort criteria and sort direction; a selection of default search criteria (the search criteria may allow for the searching of data in a displayed column); a user-defined custom search; user selected action buttons and the ability to rename and rearrange the actions; and the ability to assign another custom display to an action button.

Using the user interface shown in FIG. 4, the user may select (from the dropdown menu 410 shown in FIG. 4) a new type of custom application to create or the user may select (from the grid 420 shown in FIG. 4) an existing custom application to modify. Once a custom application is selected as shown in FIG. 4, a user may then begin to customize the selected application. For example, in the screenshot of user interface 52 shown in FIG. 5, customization occurs by first accessing a user interface that displays a list of applications. From this list, the user selects one of the named applications to modify. Further, although not shown in FIG. 5, additional information may be presented to the user when selecting an application to modify. For example, information may be provided relating to the name of the module that implements the application, the date and time of the last modification of the application, and a last user who modified the application.

Once an application is selected for customization, a user interface, such as that of the screenshot of user interface 54 shown in FIG. 6, is displayed to allow the user to add, remove, or edit information about the selected application. Such information may include, for example, a category 610 and a name of the selected application 620 and/or a short text description 630 of the selected application.

Now referring to FIG. 7, which shows a screenshot of user interface 56, a user may select what error information 710 to display. A check mark 720 indicates that the corresponding error information will be displayed. The user may deselect particular error information by removing the corresponding check mark(s) 720. Error information may relate to, for example, an identification number of an error, an identification of the application that reports an error, the username of the user who experiences an error, the date and time or an error, the data and time when an error was recorded, the name of a machine that experiences an error, an identification of the module in which an error occurs, and/or whether an error is recoverable. The error columns 730 shown in FIG. 7 are defined in the module definition file that pertains to the module that the custom application belongs according to the module definition file. The column names shown in the first column of this view are suggested names and indicate to the user what data the column will show. In one or more embodiments, the user may rename a selected column to a user-defined column name by entering data in the column next to it (not shown). Such a renamed column will then be the name that is shown to the user when viewing the custom application.

Now referring to FIG. 8, which shows a screenshot of user interface 58, a user may select columns of data on which to perform operations. The user may select columns, specify an operation (e.g., add, multiply, subtract, divide, determine average, determine maximum, determine minimum) to perform on the selected columns, and have the results displayed in a new column.

Figure 9:
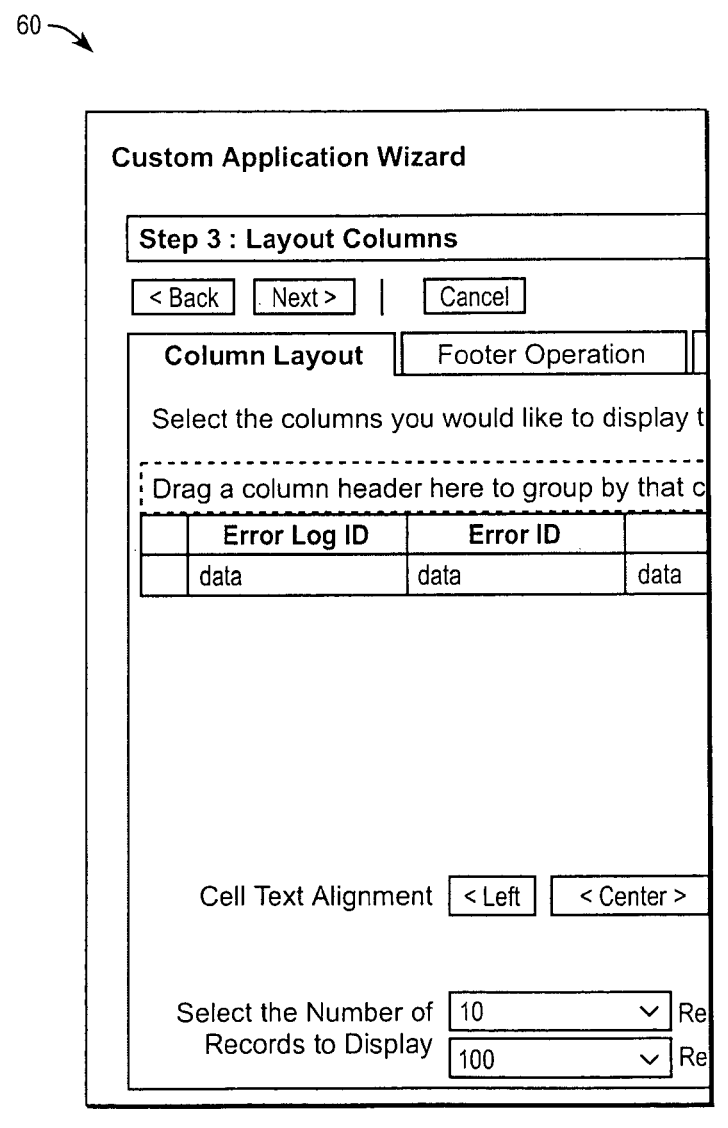

Now referring to FIG. 9, which shows a screenshot of user interface 60, a user may select how to display selected columns of data. For example, the user may specify the number of records displayed on each page of a selected custom application, the number of records displayed by a search (of module data returned from a database, e.g., database 36 shown in FIG. 2), a criteria for performing a quick search, a default criteria for sorting data, and/or a default sort direction (e.g., ascending, descending) of data returned by a search.

Further, in one or more embodiments, the user may rearrange columns in the order the user wishes to view them by dragging and dropping the column headers into any position in the view. Further still, in one or more embodiments, the user may group data by one or more columns by dragging and dropping the column header into the area above the view marked "Drag a column header here to group by that column". The alignment of each column may also be set by selecting the cell under the column header and clicking one of the "Cell Text Alignment" buttons marked "Left", "Center", and "Right" (not shown). This will result in the data being displayed with the selected justification when the user views the custom application.

Figure 10:
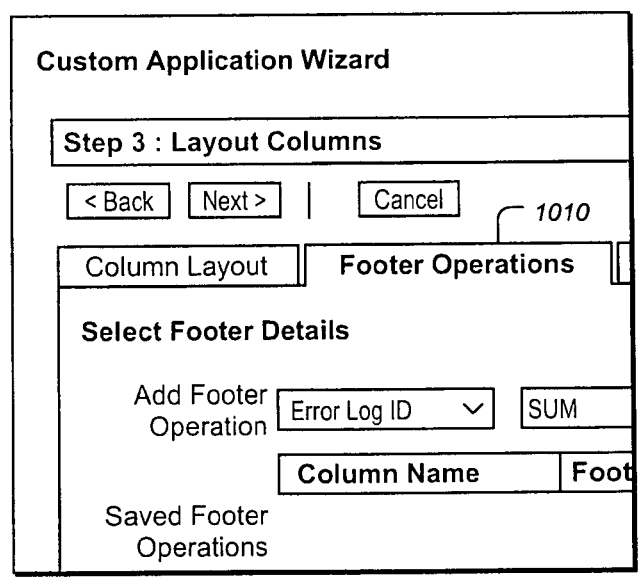
FIG. 10 illustrates a screenshot of a user interface for building a custom application in accordance with an embodiment of the present invention.

Now referring to FIG. 10, which shows a screenshot of user interface 62, a user may select how to display and perform "footer" operations 1010. Footer operations 1010 provide the ability to create custom footers for displaying calculations. Such footers are under the control of the user and may be displayed under the columns on which they perform calculations. Calculation results displayed in a footer may result from determining, for example, the average of the values in the column, the number of values in the column, the minimum value in the column, the maximum value in the column, and/or the sum of the values in the column.

Figure 11:
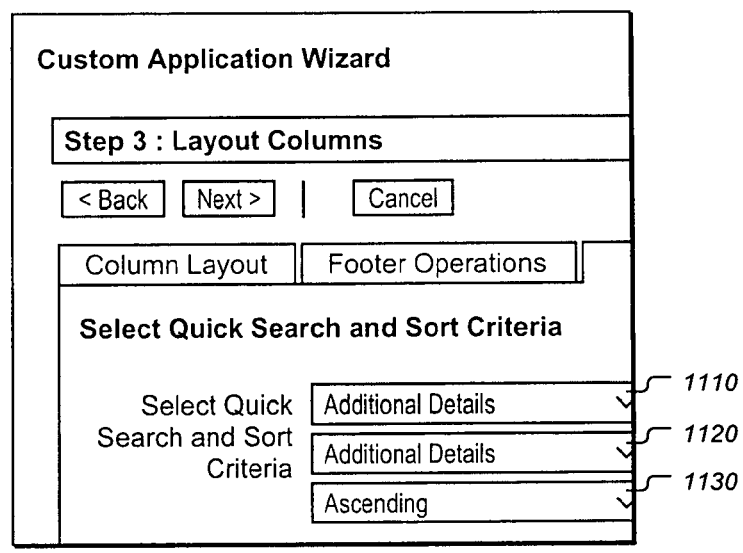
FIG. 11 illustrates a screenshot of a user interface for building a custom application in accordance with an embodiment of the present invention.

Now referring to FIG. 11, which shows a screenshot of user interface 64, a user may select how displayed data is to be sorted. For example, the user may specify a criteria for searching data 1110, a default criteria for sorting returned search data 1120, and/or a default direction 1130 (e.g., ascending, descending) for sorting returned search data. In one or more embodiments, a drop-down menu may allow the user to select a column that can be "Quick Searched", meaning that the user will not have to popup a search window when viewing the custom application, but rather can enter search criteria at will for that column directly above the custom application view. Both the drop-down menus for "Quick Search" and "Sorting" may be defined in the module definition file.

Figure 12:
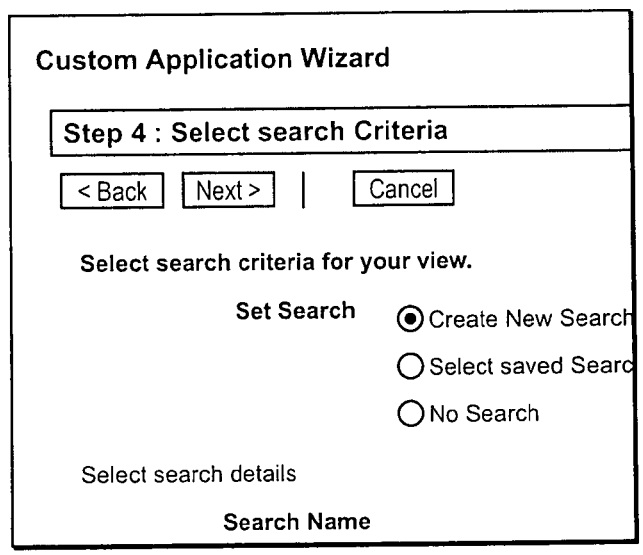
FIG. 12 illustrates a screenshot of a user interface for building a custom application in accordance with an embodiment of the present invention.
Figure 14:
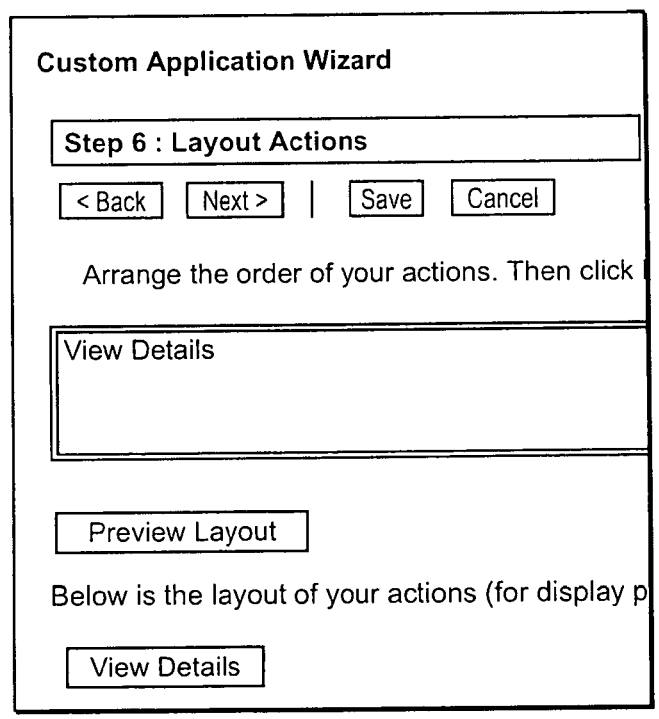
FIG. 14 illustrates a screenshot of a user interface for building a custom application in accordance with an embodiment of the present invention.

Now referring to FIG. 12, which shows a screenshot of user interface 66, a user may create a new search (of module data returned from a database, e.g., database 36 shown in FIG. 2). In creating a new search, the user may specify the type of search to conduct. The parameters available to the user for searching that are shown in the user interface 66 of FIG. 12 may be defined in the module definition file. Further, the type of data that the column pertains to may dictate what type of search criteria input the user may see. For example, if a column is defined as a "Date" type, the user may see a calendar date picker control, whereas if the type is "String", the user may see a textbox.

Now referring to FIG. 13, which shows a screenshot of user interface 68, a user may select which actions to perform on displayed data. For example, performable actions may include sorting data, searching data, and/or calculating values using displayed data. Further, now referring to a screenshot of user interface 70 shown in FIG. 14, the user may select the order of actions to be performed on displayed data.

Further, in one or more embodiments, a user may be allowed to only generate custom displays of data. In other words, a user may not be allowed to perform actions on displayed data. The actions that are available to the user for choosing actions may be defined according to the module definition file.

Deleting Custom Applications

In one or more embodiments, a user may delete a custom application. This may be achieved by selecting a particular custom application from a list of available applications (e.g., the list of applications shown in FIG. 4) and then deleting the selected custom application. Further, in one or more embodiments, only an owner of a custom application may be allowed to delete that custom application.

Copying Custom Applications

In one or more embodiments, a user may copy a custom application. This may be achieved by selecting a particular custom application from a list of available applications (e.g., the list of applications shown in FIG. 4) and then copying the selected custom application as a new, possibly renamed, custom application. Such a feature allows the user to copy the attributes of a first custom application to a second custom application, thereby avoiding the need to wholly re-customize the second application.

Further, in one or more embodiments, a custom application may be shared among various users. Further still, in one or more embodiments, a custom application may be designated as "private", whereby users other than an owner of the custom application may be prevented from accessing the custom application. Further still, in one or more embodiments, an owner of a custom application may specify those users that may access the custom application. Further still, in one or more embodiments, an owner designation of a custom application may be changed either by the current owner or another user that has appropriate privileges.

Figure 15:
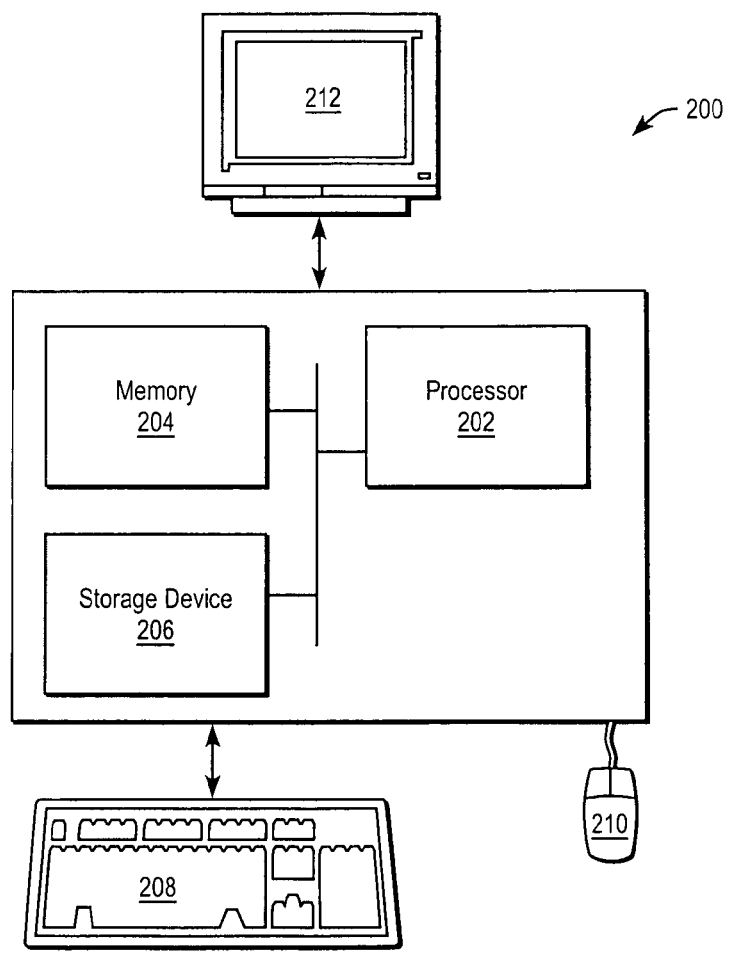
FIG. 15 illustrates a computer system in accordance with an embodiment of the present invention.

Further, one or more embodiments of the present invention may be associated with virtually any type of computer system, including multiprocessor and multithreaded uniprocessor systems, regardless of the platform being used. For example, as shown in FIG. 15, a networked computer system 200 includes at least one processor (e.g., a general-purpose processor, a field-programmable gate array (FPGA), an application-specific integrated circuit (ASIC), a graphics processor) 202, associated memory 204, a storage device 206, and numerous other elements (not shown) and functionalities typical of modern computer systems. The networked computer system 200 may also include input means (e.g., a keyboard 208, a mouse 210) and output means (e.g., a monitor 212). The networked computer system 200 may be connected to a local area network (LAN) or a wide area network (WAN) via a network interface connection (not shown). Those skilled in the art will appreciate that these input and output means may take other forms. Further, those skilled in the art will appreciate that one or more elements of the networked computer system 200 may be remotely located and connected to the other elements over a network. Further, software instructions to perform one or more embodiments of the present invention may be stored on a computer-readable medium such as a compact disc (CD), a diskette, a tape, a file, a hard drive, or any other computer-readable storage device.

Advantages of the present invention may include one or more of the following. In one or more embodiments, a user in supply chain management may select how and what supply chain data to view and/or perform actions on.

Further, in one or more embodiments, a user in supply chain management may customize supply chain management software applications to improve supply chain operations.

Further, in one or more embodiments, custom applications for supply chain management may be shared among multiple users.

While the invention has been described with respect to a limited number of embodiments, those skilled in the art, having benefit of the above description, will appreciate that other embodiments may be devised which do not depart from the scope of the invention as described herein. Accordingly, the scope of the present invention should be limited only by the appended claims.

What is claimed is:

1. A computer-implemented method for generating a custom application, comprising:
storing application parameters of a custom application for displaying supply chain data stored in a database, the application parameters defining a user-customized order of actions to be performed on the supply chain data and a type of the custom application;
receiving a request for the supply chain data issued over a computer network by a trading partner in a supply chain network;
responsive to receiving the request for the supply chain data from the trading partner, automatically identifying a role of the trading partner in the supply chain network and generating at least one application parameter based on the role of the trading partner;
generating the custom application comprising one or more user interfaces based on the application parameters and the at least one application parameter based on the role of the trading partner; and
rendering for display to the trading partner the custom application based on a format for display described in the at least one application parameter.

2. The computer-implemented method of claim 1, further comprising:
permitting the trading partner to perform the actions on the supply chain data based on the at least one application parameter.

3. The computer-implemented method of claim 2, wherein the actions performed on the supply chain data by the trading partner comprise at least one of:
deleting data;
modifying data;
reorganizing data;
adding data;
searching data; and
calculating values based on the supply chain data.

4. The computer-implemented method of claim 3, further comprising:
storing the custom application comprising one or more user interfaces based on the application parameters and the at least one application parameter based on the role of the trading partner, as a custom module in the database.

5. The computer-implemented method of claim 4, wherein the custom module displays at least one of:
purchase order data stored in the database;
inventory data stored in the database;
invoice data stored in the database; and
management data stored in the database.

6. The computer-implemented method of claim 4, wherein the trading partner configures at least one of:
a selection of columns of data displayed by the custom module;
names of the columns of data displayed by the custom module;
widths of the columns of data displayed by the custom module;
alignments of the columns of data displayed by the custom module;
default sort criteria and sort direction of the columns of data displayed by the custom module;
a selection of default search criteria of the columns of data displayed by the custom module;
custom search criteria displayed by the custom module; and
names and functions of custom action buttons displayed by the custom module.

7. The computer-implemented method of claim 4, wherein the custom module displays at least one of:
an identification number of an error associated with the supply chain data;
an identification of an application that reports a supply chain data error;
an identity of a first trading partner that experiences the supply chain data error;
a date and time of the supply chain data error;
an identification of a first custom module in which the supply chain data error occurs; and
whether the supply chain data error is recoverable.

8. A system for generating a custom supply chain management application, comprising:
an application customization engine tangibly embodied on a non-transitory computer-readable medium and configured to receive application parameters for a custom application, the application parameters describing at least one user-customized display of supply chain data, and the application customization engine configured to:
store the application parameters for the custom application for displaying supply chain data stored in a database, the application parameters defining a user-customized order of actions to be performed on the supply chain data and a type of the custom application;

receive a request for the supply chain data issued over a computer network by a trading partner in a supply chain network;
automatically identify, in response to receiving the request for the supply chain data from the trading partner, a role of the trading partner in the supply chain network and generate at least one application parameter based on the role of the trading partner;
generate the custom application comprising one or more user interfaces based on the application parameters and the at least one application parameter based on the role of the trading partner; and
render for display to the trading partner the custom application based on a format for display described in the at least one application parameter.

9. The system of claim 8, wherein the application customization engine is further configured to:
permit the trading partner to perform the actions on the supply chain data based on the at least one application parameter.

10. The system of claim 9, wherein the actions performed on the supply chain data by the trading partner comprise at least one of:
deleting data;
modifying data;
reorganizing data;
adding data;
searching data; and
calculating values based on the supply chain data.

11. The system of claim 10, wherein the application customization engine is further configured to:
store the custom application comprising one or more user interfaces based on the application parameters and the at least one application parameter based on the role of the trading partner, as a custom module in the database.

12. The system of claim 11, wherein the custom module displays at least one of:
purchase order data stored in the database;
inventory data stored in the database;
invoice data stored in the database; and
management data stored in the database.

13. The system of claim 11, wherein the trading partner configures at least one of:
a selection of columns of data displayed by the custom module;
names of the columns of data displayed by the custom module;
widths of the columns of data displayed by the custom module;
alignments of the columns of data displayed by the custom module;
default sort criteria and sort direction of the columns of data displayed by the custom module;
a selection of default search criteria of the columns of data displayed by the custom module;
custom search criteria displayed by the custom module; and
names and functions of custom action buttons displayed by the custom module.

14. The system of claim 11, wherein the custom module displays at least one of:
an identification number of an error associated with the supply chain data;
an identification of an application that reports a supply chain data error;
an identity of a first trading partner that experiences the supply chain data error;
a date and time of a supply chain data error;
an identification of a first custom module in which the supply chain data error occurs; and
whether the supply chain data error is recoverable.

15. A non-transitory computer-readable medium embodied with software for generating a customized application, the software when executed using a computer system configured to:
receive and store application parameters of a custom application for displaying supply chain data stored in a database, the application parameters defining a user-customized order of actions to be performed on the supply chain data and a type of the custom application;
receive a request for the supply chain data issued over a computer network by a trading partner in a supply chain network;
automatically identify, in response to receiving the request for the supply chain data from the trading partner, a role of the trading partner in the supply chain network and generate at least one application parameter based on the role of the trading partner;
generate the custom application comprising one or more user interfaces based on the application parameters and the at least one application parameter based on the role of the trading partner; and
render for display to the trading partner the custom application based on a format for display described in the at least one application parameter.

16. The non-transitory computer-readable medium of claim 15, wherein the software when executed using the computer system is further configured to:
permit the trading partner to perform the actions on the supply chain data based on the at least one application parameter.

17. The non-transitory computer-readable medium of claim 16, wherein the actions performed on the supply chain data by the trading partner comprise at least one of:
deleting data;
modifying data;
reorganizing data;
adding data;
searching data; and
calculating values based on the supply chain data.

18. The non-transitory computer-readable medium of claim 17, wherein the software when executed using the computer system is further configured to:
store the custom application comprising one or more user interfaces based on the application parameters and the at least one application parameter based on the role of the trading partner, as a custom module in the database.

19. The non-transitory computer-readable medium of claim 18, wherein the custom module displays at least one of:
purchase order data stored in the database;
inventory data stored in the database;
invoice data stored in the database; and
management data stored in the database.

20. The non-transitory computer-readable medium of claim 18, wherein the trading partner configures at least one of:
a selection of columns of data displayed by the custom module;
names of the columns of data displayed by the custom module;
widths of the columns of data displayed by the custom module;

alignments of the columns of data displayed by the custom module;
default sort criteria and sort direction of the columns of data displayed by the custom module;
a selection of default search criteria of the columns of data displayed by the custom module;
custom search criteria displayed by the custom module; and
names and functions of custom action buttons displayed by the custom module.

* * * * *